United States Patent

Kato et al.

[11] Patent Number: 5,219,460
[45] Date of Patent: Jun. 15, 1993

[54] CLOCKSPRING CONNECTOR

[75] Inventors: Hironori Kato, Sendai; Kunihiko Sasaki, Miyagi; Hiroyuki Bannai, Furukawa, all of Japan

[73] Assignee: Alps Electric Co., Ltd., Tokyo, Japan

[21] Appl. No.: 875,929

[22] Filed: Apr. 29, 1992

[30] Foreign Application Priority Data

May 9, 1991 [JP] Japan .................... 3-132250

[51] Int. Cl.⁵ ............................ H01R 35/00
[52] U.S. Cl. ............................ 439/164; 439/15
[58] Field of Search ....................... 439/15, 164

[56] References Cited

U.S. PATENT DOCUMENTS 4,540,223  9/1985  Schmerda et al.
5,046,951  9/1991  Suzuki

FOREIGN PATENT DOCUMENTS 0236977  9/1990  Japan .................... 439/164

Primary Examiner—Eugene F. Desmond
Attorney, Agent, or Firm—Guy W. Shoup; Patrick T. Bever

[57] ABSTRACT

A clockspring connector comprises a lower case (1) having an outer cylindrical wall (7), an upper case (2) having an inner cylindrical wall (8) and mounted on the lower case (1) so as to be able to turn relative to the fixed member (1), an intermediate movable member (4) placed in an annular space (10) formed between the outer cylindrical wall (7) and the inner cylindrical wall (8) so as to be able to turn relative to the lower case (1) and the upper case (2), and a flexible cable (3) contained in the annular space (10) and having an inverting portion (3a) and portions extending on the opposite aides of the inverting portion (3a) and wound in opposite directions on the inner cylindrical wall (8) and the outer cylindrical wall (7), respectively. The intermediate movable member (4) has a shape substantially resembling the letter C, the inverting portion (3a) turns around one of the opposite ends of the intermediate movable member (4), and a slippery member (13) is provided on at least either the inner circumference or the outer circumference of the intermediate movable member (4) to enable the flexible cable (3) to slip smoothly along the intermediate movable member (4) when the lower case (1) or the upper case (2) is turned relative to the other.

6 Claims, 5 Drawing Sheets

CLOCKSPRING CONNECTOR

BACKGROUND OF THE INVENTION

1. Field of the Invention

The present invention relates to a clockspring connector for electrically interconnecting a fixed member and a movable member of an automotive steering system or the like by a flexible cable.

2. Description of the Prior Art

A clockspring connector for interconnecting a fixed member and a movable member movable relative to the fixed member by a flexible cable is employed in electrically connecting a movable member capable of rotating by a limited number of turns and a fixed member of an automotive steering system. The ratio of the cost of the flexible cable to the total cost of the clockspring connector of this kind is large. A clockspring connector proposed in U.S. Pat. No. 4,540,223 is intended to reduce its cost by reducing the length of the flexible cable included therein.

As shown in FIG. 9, the clockspring connector proposed in U.S. Pat. No. 4,540,223 has a cylindrical fixed member 100, a movable member 101 mounted for rotation on the fixed cylindrical member 100, and a flexible cable 103 contained in an annular space 102 formed between the fixed member 100 and the movable member 101. The opposite ends of the flexible cable 103 is fastened respectively to the fixed member 100 and the movable member 101. The winding direction of the flexible cable 103 is inverted at its U-shaped inverting portion 103a in the annular space 102. An intermediate movable member 104 having a shape resembling the letter C in a plan view is nested in the annular space 102 so as to be movable in circumferential directions. The inverting portion 103a of the flexible cable 103 is wound around a roller 105 supported for rotation on one open end of the intermediate movable member 104.

When the movable member 101 is turned clockwise as viewed in FIG. 9, the inverting portion 103a of the flexible cable 103 moves in a circumferential direction within the annular space 102, so that the number of coils of the flexible cable 103 wound on the outer cylinder of the fixed member 100 increases and hence the flexible cable is unwound. On the contrary, when the movable member 101 is turned counterclockwise, the inverting portion 103a of the flexible cable 103 moves in the same direction, so that the flexible cable 103 is taken up on the movable member 101 and the number of coils of the flexible cable 103 wound on the inner cylinder of the movable member 101 increases. When the flexible cable 103 is thus unwound or taken up, the intermediate movable member 104 is moved in the same direction by the force applied thereto by the inverting portion 103a.

In this prior art clockspring connector, the direction of winding the flexible cable 103 on the inner cylinder and that of winding the flexible cable 103 on the outer cylinder 101 are opposite to each other. Therefore, the length of the flexible cable 103 is far less than that of a flexible cable included in an equivalent clockspring connector in which the flexible cable is wound in a spiral coils and hence the cost of the former clockspring connector is lower than that of the latter clockspring connector. Since the intermediate movable member is disposed between a portion of the flexible cable wound on the inner cylinder and a portion of the flexible cable wound on the outer cylinder and the inverting portion of the flexible cable is wound around the roller supported for rotation on one end of the intermediate movable member, the flexible cable can be wound on the inner cylinder or the outer cylinder by the inverting portion in winding or unwinding the flexible cable.

However, in winding or unwinding the flexible cable, the flexible cable tends to expand radially. For example, when the movable member is turned in a direction to wind the flexible cable on the inner cylinder, a portion of the flexible cable extending between the outer cylinder and the inverting portion expands slightly radially inward (toward the inner cylinder) and touches the outer circumference of the movable member and, when the movable member is turned in a direction to wind the flexible cable on the outer cylinder, a portion of the flexible cable extending between the inner cylinder and the inverting portion expands slightly radially outward (toward the outer cylinder) and touches the inner circumference of the movable member. In either case, the flexible cable is unable to advance smoothly toward the inverting position due to the frictional resistance of the movable member.

SUMMARY OF THE INVENTION

Accordingly, it is an object of the present invention to provide a reliable clockspring connector having a movable member capable of smooth turning.

In a clockspring connector in one aspect of the present invention is characterized in that a flexible cable is wound around at one open end of an intermediate movable member having a shape resembling the letter C, and the intermediate movable member is provided with a slippery member on at least either the outer or inner circumference thereof.

When the intermediate movable member turns in a direction, a U-shaped inverting portion of the flexible cable moves in the same direction, so that the flexible cable is taken up on an inner cylinder or an outer cylinder. For example, when the intermediate movable member is turned in a winding direction, the radial expansion of a portion of the flexible cable wound on the outer cylinder is limited by the outer circumference of the intermediate movable member. However, since the intermediate movable member is provided on its outer circumference with the slippery member, frictional resistance of the intermediate movable member against the flexible cable is very small. When the intermediate movable member is turned in an unwinding direction, the radially outward expansion of the flexible cable wound on the inner cylinder is limited by the inner circumference of the intermediate movable member. However, since the intermediate movable member is provided on its inner circumference with the slippery member, frictional resistance of the intermediate movable member against the flexible cable is very small. In either case, the flexible cable is able to advance smoothly via the inverting portion toward the outer cylinder.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
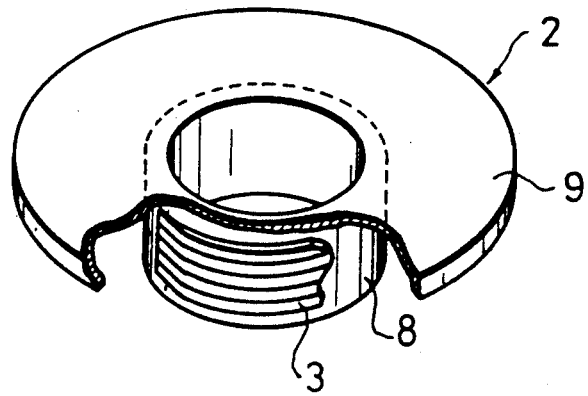
FIG. 1 is a partially broken exploded perspective view of a clockspring connector in a first embodiment according to the present invention.
Figure 1:
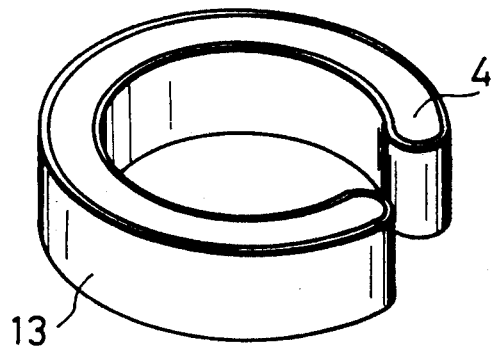
Figure 1:
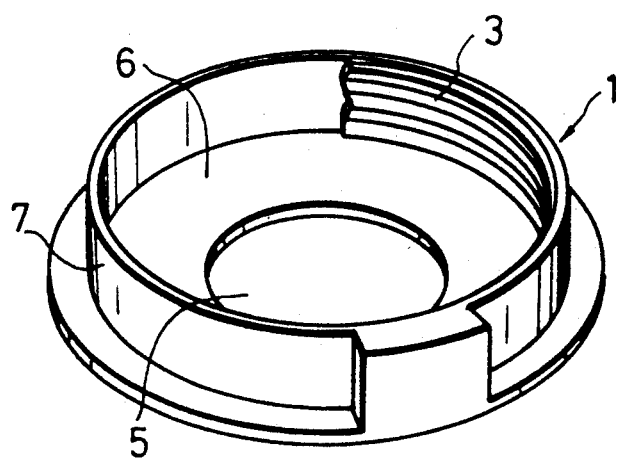
Figure 2:
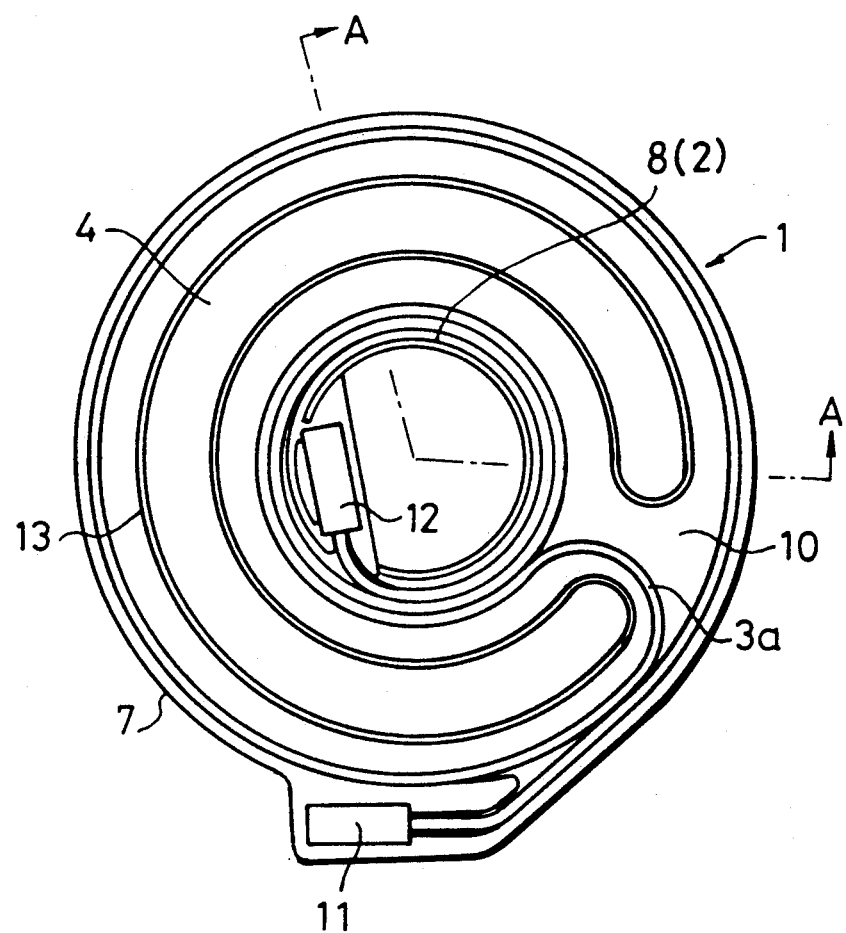
FIG. 2 is a partly omitted plan view of the clockspring connector of FIG. 1.
Figure 3:
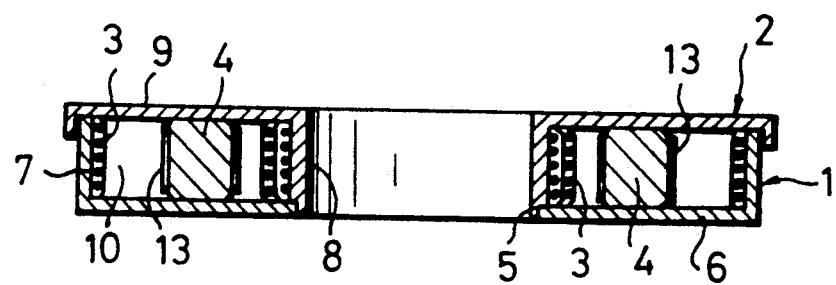
FIG. 3 is a sectional view taken on line A—A in FIG. 2.

Referring to FIGS. 1, 2 and 3, a clockspring connector in a first embodiment according to the present invention comprises a lower case 1, an upper case 2 mounted for rotation on the lower case 1, a flexible cable 3 contained in a space between the lower case 1 and the upper case 2, and an intermediate movable member 4 disposed between the coils of the flexible cable 3.

The lower case 1 has a bottom wall 6 provided in its central portion with a hole 5, and an outer cylindrical wall 7 axially extending from the bottom wall 6. The lower case 2 has a top wall 9 and an inner cylindrical wall 8 axially extending from the top wall 9. The lower case 1 and the upper case 2 are combined with the inner cylindrical wall 8 of the upper case 2 fitted in the hole 5 of the bottom wall 6 of the lower case 1, and the top wall 9 of the upper case 2 fitted in the outer cylindrical wall 7 of the lower case 1 so that the upper case 2 is able to rotate relative to the lower case 1. An annular space 10 is formed between the outer cylindrical wall 7 of the lower case 1 and the inner cylindrical wall 8 of the upper case 2.

The flexible cable 3 is a flat flexible cable formed by sandwiching five parallel conductors between a pair of insulating strips. As shown in FIG. 2, the flexible cable 3 has one end connected to a first connector 11 fixed to the outer side wall 7 of the lower case 1 and connected to external circuits. The other end of the flexible cable 3 is connected to a second connector 12 fixed to the inner cylindrical wall 8 of the upper case 2 connected to external circuits. A portion of the flexible cable 3 extending from the first connector 11 is wound counterclockwise on the inner surface of the outer cylindrical wall 7, the flexible cable 3 is turned over at an inverting portion 3a, and the other portion of the flexible cable extending from the inverting portion 3a to the second connector 12 is wound clockwise on the outer surface of the inner cylindrical wall 8 within the annular space 10.

The intermediate movable member 4 has a shape resembling the letter C as viewed in FIG. 2. The outer and inner circumferences of the intermediate movable member 4 are coated with a slippery sheet 13, such as a polytetrafluoroethylene tape. The intermediate movable member 4 is placed in the annular space 10 so as to turn around the inner cylindrical wall 8. The inverting portion 3a of the flexible cable 3 is turned over along one round end of the intermediate movable member 4, coated with the slippery tape 13.

The function of the clockspring connector will be described on an assumption that the lower case 1 serves as a fixed member, and the upper case 2 serves as a movable member. When the upper case 2 of the clockspring connector in a state as shown in FIG. 2 is turned clockwise through an angle, the flexible cable 3 advances clockwise through the inverting portion 3a by a distance corresponding to an angle slightly smaller than the angle of turning of the upper case 2. Then, a length of the flexible cable 3 corresponding to the distance is unwound from the inner surface of the outer cylindrical wall 7 and the same length of the flexible cable 3 is taken up on the inner cylindrical wall 8. In this case, the flexible cable 3 tends to expand radially inward and comes into frictional contact with a portion of the slippery tape 13 on the outer circumference of the intermediate movable member 4, and the inverting portion 3a of the flexible cable 3 comes into frictional contact with the corresponding end of the intermediate movable member 4 to push the intermediate movable member clockwise. Thus, the radially inward expansion of the flexible cable 3 is limited by the intermediate movable member 4, the flexible cable 3 is unwound from the outer cylindrical wall 7 toward the inverting portion 3a and the flexible cable 3 is taken up smoothly on the inner cylindrical wall 8, because the side surfaces of the intermediate movable member 4 are coated entirely with the slippery tape 13.

When the upper case 2 in the state shown in FIG. 2 is turned counterclockwise through an angle, the flexible cable 3 advances counterclockwise through the inverting portion 3a by a distance corresponding to an angle slightly smaller than the angle of turning of the upper case 2; consequently, a length of the flexible cable corresponding to the distance is unwound from the inner cylindrical wall 8 and taken up on the outer cylindrical wall 7. In this case, the flexible cable 3 wound on the inner cylindrical wall 8 tends to expand radially outward, comes into frictional contact with the inner circumference of the intermediate movable member 4 and with the other end of the intermediate movable member 4 to push the intermediate movable member 4 counterclockwise. The radially outward expansion of the portion of the flexible cable 3 wound on the inner cylindrical wall 8 is limited by the intermediate movable member 4, the flexible cable 3 is unwound smoothly from the inner cylindrical wall 8 and taken up smoothly on the outer cylindrical wall 7, because the side surfaces of the intermediate movable member 4 are coated entirely with the slippery tape 13.

Since the portion of the flexible cable 3 o the side of the outer cylindrical wall 7 and the portion of the flexible cable 3 on the side of the inner cylindrical wall 8 with respect to the inverting portion 3a are wound respectively in opposite directions, the flexible cable 3 may be of a relatively short length, which reduces the cost of the clockspring connector and enables the clockspring connector to be formed in a relatively small construction. Since the radially inward expansion of the portion of the flexible cable 3 wound on the outer cylindrical wall 7 is limited by the intermediate movable member 4 having side surfaces coated with the slippery tape 13, the frictional resistance of the outer circumference of the intermediate movable member 4 against the movement of the flexible cable 3 in taking up the flexible cable 3 is very small. Similarly, since radially outward expansion of the portion of the flexible cable 3 wound on the inner cylindrical wall 8 is limited by the inner circumference of the intermediate movable member 4 coated with the slippery tape 13, the frictional resistance of the intermediate movable member 4 against the movement of the flexible cable 3 in unwinding the flexible cable 3 is very small. Accordingly, when the upper case 2 is turned in either direction, the rotative force of the upper case 2 is transmitted surely to the inverting portion 3a of the flexible cable 3 and the movement of the flexible cable toward the inverting portion 3a is not obstructed by the intermediate movable member 4. Furthermore, since the inverting portion 3a of the flexible cable 3 extends between the opposite ends of the intermediate movable member coated with the slippery tape 13, the inverting portion 3a is able to move smoothly in taking up and in unwinding the flexible cable 3.

Figure 4:
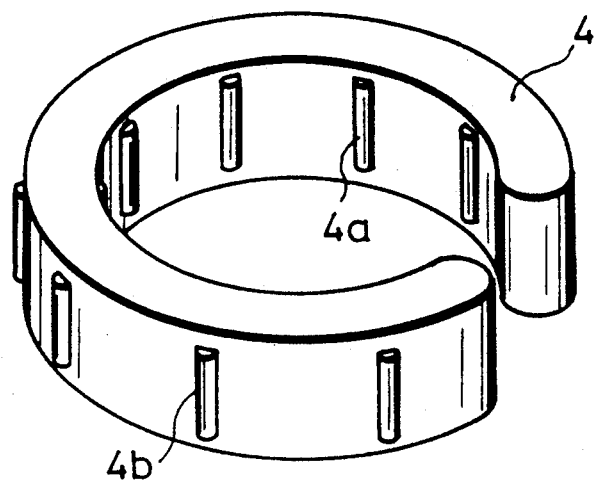
FIG. 4 is a perspective view of a component part of a clockspring connector in a second embodiment according to the present invention.

An intermediate movable member 4 shown in FIG. 4 employed in a clockspring connector in a second embodiment according to the present invention is a modification of the intermediate movable member 4 of FIG. 1. This intermediate movable member 4 is provided integrally with semicylindrical ridges 4a and 4b axially extending on the inner and outer circumferences at predetermined angular intervals. The inverting portion 3a of the flexible cable 3 is bent around one of the opposite ends of the intermediate movable member 4. In taking up or unwinding the flexible cable 3, the portion of the flexible cable 3 wound on the outer cylindrical wall 7 comes into contact with the ridges 4b on the outer circumference of the intermediate movable member 4, and the portion of the flexible cable wound on the inner cylindrical wall 8 comes into contact with the ridges 4a on the inner circumference of the intermediate movable member 4. Although the frictional resistance of the intermediate movable member 4 against the movement of the flexible cable 3 is slightly greater than that of the intermediate movable member 4 employed in the first embodiment, the effect of the clockspring connector in the second embodiment is substantially the same as that of the clockspring connector in the first embodiment.

Figure 5:
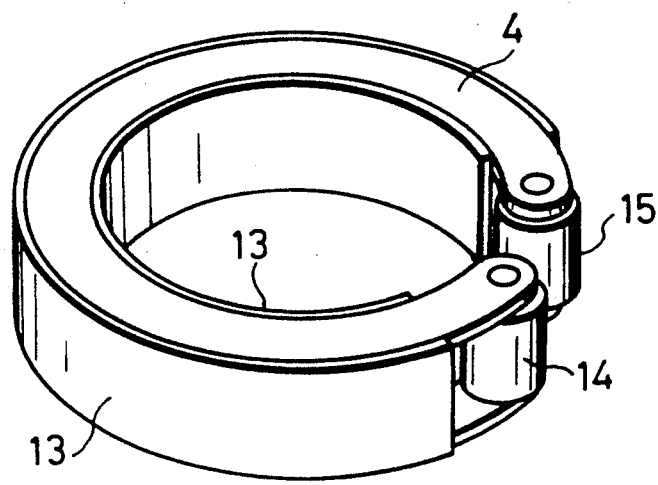
FIG. 5 is a perspective view of a component part of a clockspring connector in a third embodiment according to the present invention.

A clockspring connector in a third embodiment according to the present invention employs an intermediate movable member 4 shown in FIG. 5. This intermediate movable member is provided with rollers 14 and 15 supported for rotation at the opposite ends thereof. The outer and inner circumferences of the intermediate movable member 4 are coated with a slippery tape 13. When the upper case 2 is turned in either direction, the inverting portion 3a of the flexible cable 3 touches with either of the rollers 14 and 15 and the roller 14 or 15 rolls as the inverting portion 3a moves. Accordingly, the inverting portion 3a is able to move smoothly. The slippery tape 13 coating the outer and inner circumferences of the intermediate movable member 4 enables the flexible cable 3 to slide smoothly along the outer and inner circumferences of the intermediate movable member 4 in taking up and in unwinding the flexible cable 3.

Figure 6:
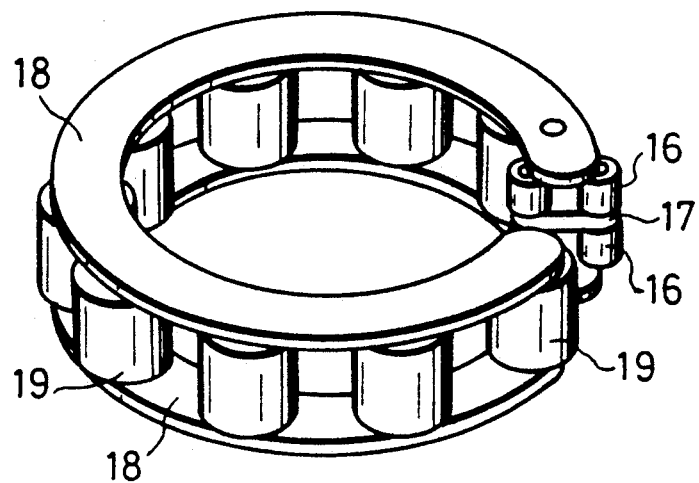
FIG. 6 is a perspective view of a component part of a clockspring connector in a fourth embodiment according to the present invention.

A clockspring connector in a fourth embodiment according to the present invention employs an intermediate movable member 4 shown in FIG. 6. This intermediate movable member 4 comprises a pair of C-shaped rings 18, a plurality of cylindrical slippery members 19 fixedly held between the pair of rings 18 at predetermined intervals, and a guide roller structure consisting of an arm 17 pivotally supported between one end of one of the pair of rings 18 and the corresponding end of the other ring 18, and four small rollers 16 supported for rotation on the arm 17. The inverting portion 3a of the flexible cable 3 turns along the small rollers 16. When the upper case 2 is turned in either direction, the flexible cable 3 slides along the slippery members 19, and the inverting portion 3a of the flexible cable 3 slides along either the slippery member 19 held between the other end of one of the rings 18 and the corresponding end of the other ring 18, so that the flexible cable 3 is able to move smoothly. Since the small rollers 16 can radially be moved by the arm 17 within the annular space 10 toward the inner cylindrical wall 8 when the flexible cable 3 is wound densely on the outer cylindrical wall 7 or toward the outer cylindrical wall 7 when the flexible cable is wound densely on the inner cylindrical wall 8. Therefore, the radial size of the annular space 10 need not be increased even if the small rollers 16 are employed and the clockspring connector can be formed in a relatively small construction.

Figure 7:
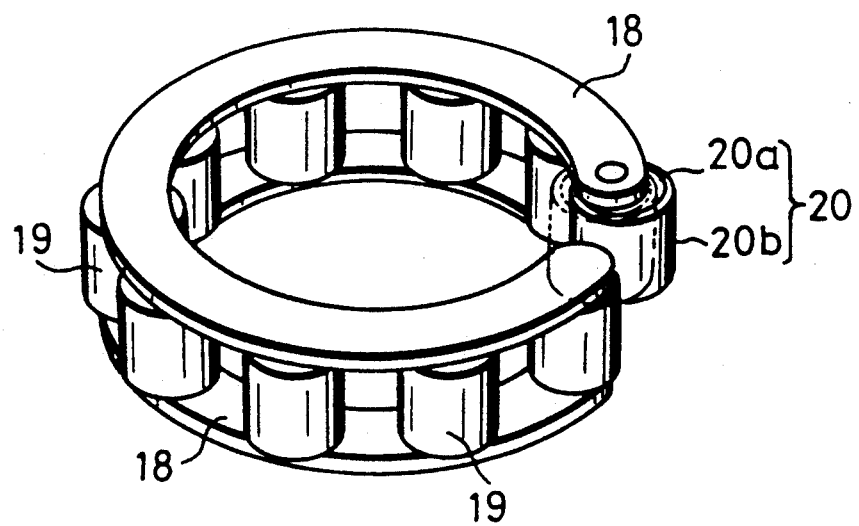
FIG. 7 is a perspective view of a component part of a clockspring connector in a fifth embodiment according to the present invention.

A clockspring connector in a fifth embodiment according to the present invention employs an intermediate movable member 4 shown in FIG. 7. Basically, this intermediate movable member 4 is similar in construction to the intermediate movable member 4 of FIG. 6, except that the intermediate movable member 4 of FIG. 7 is provided with an eccentric roller structure 20 instead of the guide roller structure. The eccentric roller structure 20 comprises a rotary member 20a fixed to a shaft and a roller 20b put on the rotary member 20a so as to rotate relative to the rotary member 20a. The cylindrical slippery members 19 of the clockspring connectors of FIGS. 6 and 7 may be replaced with a plurality of rollers supported for rotation between the pair of rings 18. These rollers further reduce the frictional resistance of the intermediate movable member 4 against the movement of the flexible cable 3, enabling the flexible cable to be taken up or unwound further smoothly.

Figure 8:
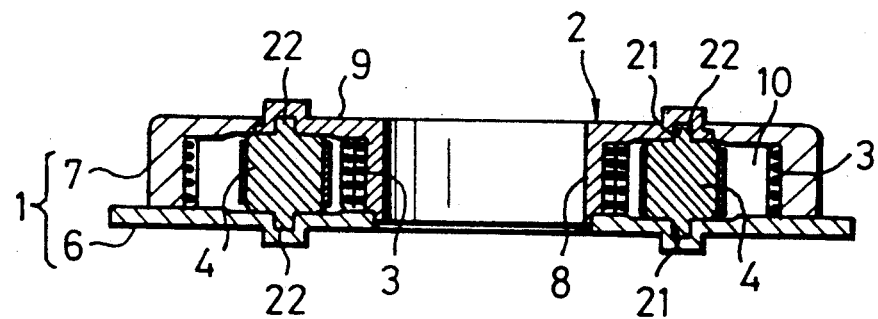
FIG. 8 is a sectional view of a clockspring connector in a sixth embodiment according to the present invention.
Figure 9:
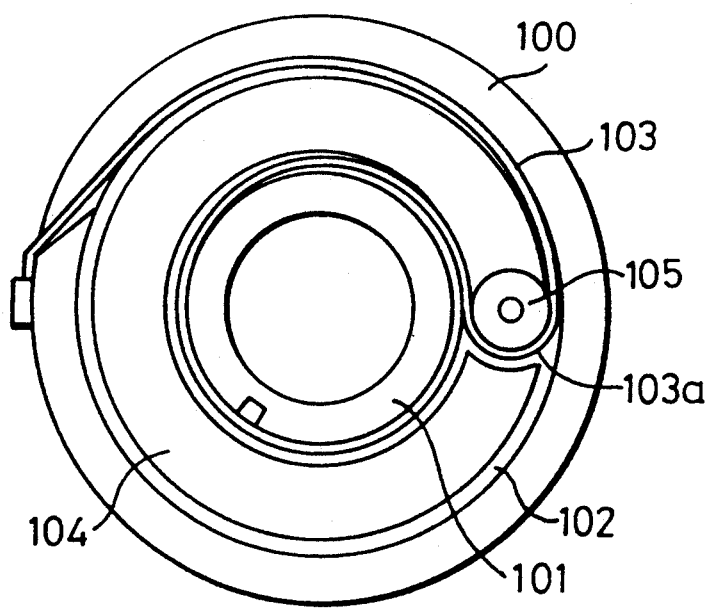
FIG. 9 is a plan view of a prior art clockspring connector.

A clockspring connector in a sixth embodiment according to the present invention shown in FIG. 8 is provided with a guide for guiding an intermediate movable member 4, which is similar to the intermediate movable member 4 of the clockspring connector in the fourth or fifth embodiment, for circumferential movement within the annular space 10. This clockspring connector has a lower case 1 having a bottom wall 6 provided with an annular groove 21 in its inner surface, and an upper case 2 having a top wall 9 provided with an annular groove 21 in its inner surface. The intermediate movable member 4 is provided on its upper and lower surfaces with guide portions 22. The intermediate movable member 4 is placed in the annular space 10 with the guide portions 22 fitted slidably in the annular grooves 21, respectively. Each guide portion 22 may be a plurality of separate projections or a substantially annular ridge corresponding to the annular groove 21. Since the annular grooves 21 guide the intermediate movable member 4 for turning about an axis and prevent the intermediate movable member 4 from eccentric turning, the excessive loading of the flexible cable 3 and the disarrangement of the flexible cable 3 attributable to the eccentric turning of the intermediate movable member 4 do not occur. Thus, the clockspring connector operates silently and the flexible cable 3 is not buckled.

The flexible cable 3 may be such a flat cable as formed by sandwiching a plurality of parallel round cables each formed by sheathing a conductor with an insulating tube between insulating strips. The number of the component conductors of the flexible cable 3 is dependent on the number of the associated circuits.

Furthermore, either the upper case 1 or the lower case 2 may be a movable member.

Although the invention has been described in its preferred embodiments, obviously many changes and variations are possible therein. It is therefore to be understood that the present invention may be practiced otherwise than as specifically described herein without departing from the spirit and scope thereof.

What is claimed is:

1. A clockspring connector including a fixed member, a movable member mounted for rotation on the fixed member and a flexible cable for connecting said fixed member to said movable member,
   said flexible cable being placed in a space between an inner cylindrical wall formed on either said fixed member or said movable member and an outer cylindrical wall formed on the other portion of said fixed member and said movable member, and is reversely wound to said inner cylindrical wall and said outer cylindrical wall through an inverting portion curved in the shape of the letter U;
   wherein a moving member having an opening is arranged in said space, said inverting portion being looped at said opening of the moving member,
   wherein at least the inner circumference or the outer circumference of said moving member is provided with a slippery surface,
   wherein a roller is supported for rotation at least on one end of the opposite ends of said opening of said moving member, and
   wherein said roller is allowed to swing in the radial direction of said space.

2. A clockspring connector according to claim 1, wherein there is provided a guide means to guide said moving member in the circumferential direction of said space.

3. A clockspring connector comprising:
   a fixed member having a first wall;
   a movable member rotatably connected to the fixed member, said movable member having a second wall, said movable member and said fixed member defining a space separating the first and second walls;
   a flexible cable having a first end connected to the fixed member and a second end connected to the movable member, the flexible cable being wound on the first and second walls through a U-shaped inverting portion; and
   an intermediate movable member disposed in said space and having an opening through which is disposed the U-shaped inverting portion, said intermediate member having an inner surface facing one of said first and second walls and an outer surface facing the other of said first and second walls, and said intermediate member including a plurality of projections disposed on at least one of the inner and outer surfaces.

4. A clockspring connector according to claim 3, wherein said intermediate movable member is formed as a ring having a circumference, and said projections are spaced around the entire circumference on at least one of the inner and outer surfaces.

5. A clockspring connector according to claim 3, wherein said projections are disposed only on the outer surface.

6. A clockspring connector according to claim 3, wherein said plurality of projections are disposed over the entire outer peripheral edge of the intermediate portion.

* * * * *